J. STEINER.
Wagon-Wheel.

No. 167,132. Patented Aug. 24, 1875.

Witnesses
Geo. H. Strong
Jno. L. Borne

Inventor
John Steiner
by Duway
Attys

UNITED STATES PATENT OFFICE.

JOHN STEINER, OF MENDON, CALIFORNIA.

IMPROVEMENT IN WAGON-WHEELS.

Specification forming part of Letters Patent No. 167,132, dated August 24, 1875; application filed June 8, 1875.

*To all whom it may concern:*

Be it known that I, JOHN STEINER, of Mendon, El Dorado county, State of California, have invented Improvements in Wagon-Wheels; and I do hereby declare the following description and accompanying drawings are sufficient to enable any person skilled in the art or science to which it most nearly appertains to make and use my said invention or improvement without further invention or experiment.

My invention relates to a novel construction for the wheels of vehicles, by which I am enabled to tighten up the tires and stiffen the whole wheel by the use of an ordinary wrench, and without taking the wheel from the vehicle. This I accomplish by means of a system of straining-spokes and screw-bolts, as will be more fully described hereafter.

Figure 1:
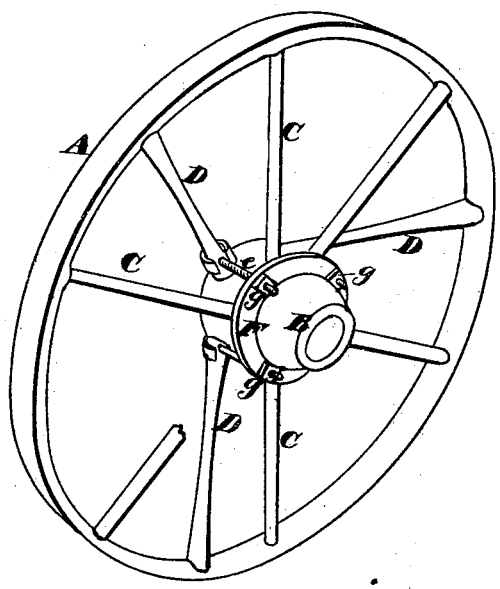
Figure 2:
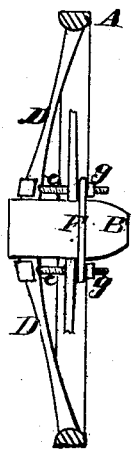

Referring to the accompanying drawings for a more complete explanation of my invention, Figure 1 is a perspective view of my wheel. Fig. 2 is a vertical section.

A is the felly of a wheel; B, the hub, and C the spokes. These latter are very apt to become loosened in dry weather, and the fellies also become shrunken, so that the tires are loosened. There is also a severe strain upon the lower spokes of heavily-loaded vehicles on rough roads. In order to remedy these evils I construct a number of supplementary bracing spokes or arms, D D, one end of which is fitted to rest against the inside of the felly at regular intervals around its circumference. The other end rests loosely upon the inner end of the hub, so as to make a considerable angle with the spokes C, as shown, and it is free to be moved out or inward, as desired. Through the end nearest the hub of these arms a hole is made, and a stout bolt, $e$, having a suitable head or clamp, is passed through the hole, so that the head is on the inside of the arm. The opposite end of the bolt passes out between the spokes close to the hub, and through a hole in the stout circular flange F, which is fitted over the outside end of the hub, so as to rest closely against the spokes. It will be manifest that when a nut, $g$, upon the end of the bolt is turned down, the inner ends of the arms D will be drawn more nearly into an upright position, thus forcing the felly outward, and making the tire perfectly tight upon it. The nuts $g$ will also draw the broad flange F closely against the spokes, so as to steady them and hold the whole securely and firmly together, and it will be seen that the strain can be at any time adjusted by simply turning the nuts more or less. This construction, by its bracing form, greatly relieves the lower spokes of the wheel of a heavily-loaded team as it revolves over rough ground, and prevents much of the strain upon them.

Having thus described my invention, what I claim, and desire to secure by Letters Patent, is—

The device consisting of the supplementary arms or spokes D and the flange or rim F, together with the uniting screw-bolts $e$, for the purpose of tightening the tire and strengthening the wheel, substantially as herein described.

In witness whereof I have hereunto set my hand and seal.

JOHN STEINER. [L. S.]

Witnesses:
GEO. H. STRONG,
JNO. L. BOONE.